United States Patent [19]

Kurr

[11] 4,206,264
[45] Jun. 3, 1980

[54] CORROSION RESISTANT FASTENERS HAVING AN OIL-FREE POLYESTER TOP COATING AND METHOD OF MANUFACTURING SAME

[75] Inventor: Donald J. Kurr, Glen Ellyn, Ill.

[73] Assignee: Duo-Fast Corporation, Franklin Park, Ill.

[21] Appl. No.: 919,433

[22] Filed: Jun. 26, 1978

[51] Int. Cl.² .................. F16B 15/00; B32B 15/08; B32B 15/02
[52] U.S. Cl. .................. 428/458; 85/1 C; 85/10 F; 148/6.15 Z; 148/6.16; 148/6.2; 148/6.27; 260/22 CB; 260/31.8 XA; 260/39 R; 260/40 R; 427/436; 427/388.2; 428/99; 428/539
[58] Field of Search .............. 85/10 F, 1 C; 148/31.5, 148/6.2, 6.27, 6.16, 6.15 Z; 428/458, 480, 482, 528, 529, 99; 427/388 A, 436; 260/22 CB, 22 CQ, 31.8 XA, 39 R, 40 R, 839, 835, 859

[56] References Cited

U.S. PATENT DOCUMENTS

| | | | |
|---|---|---|---|
| 3,164,488 | 1/1965 | Workman | 427/388 A |
| 3,544,656 | 12/1970 | Hornung et al. | 428/458 X |
| 3,553,284 | 1/1971 | Riemhofer et al. | 428/458 X |
| 3,671,331 | 6/1972 | Malkin et al. | 148/6.2 |
| 3,983,304 | 9/1976 | Sekhon | 85/1 C |
| 4,003,760 | 1/1977 | Labenski et al. | 148/6.2 |
| 4,074,011 | 2/1978 | Teramae et al. | 85/1 C |
| 4,137,368 | 1/1979 | Miller | 148/6.2 X |
| 4,141,760 | 2/1979 | Baldi | 148/31.5 |
| 4,143,790 | 3/1979 | Ueno et al. | 428/458 X |

*Primary Examiner*—Harold Ansher
*Attorney, Agent, or Firm*—Mason, Kolehmainen, Rathburn & Wyss

[57] ABSTRACT

A fastener and method of manufacturing fasteners is disclosed including coating the fastener with a cured, oil-free polyester coating, the cured polyester coating comprising the reaction product of one or more polyols selected from the group consisting of pentaerythritol, trimethylolpropane, glycerol, ethylene glycol, triethylene glycol, neopentyl glycol, trimethylolethane, 1,2 hexanediol, 1,3 butenediol, and mixtures thereof; one or more dibasic organic acids selected from the group consisting of phthalic acid, isophthalic acid, maleic acid, adipic acid, succinic acid, sebacic acid, fumaric acid, and mixtures thereof; and an aminoplast cross-linking agent selected from the group consisting of melamine-formaldehyde, urea-formaldehyde, hexahydroxymethyl melamine, and mixtures thereof.

21 Claims, No Drawings

CORROSION RESISTANT FASTENERS HAVING AN OIL-FREE POLYESTER TOP COATING AND METHOD OF MANUFACTURING SAME

FIELD OF THE INVENTION

The present invention relates to a new and improved fastener and a method of manufacturing fasteners, such as nails, staples and the like. More particularly, the present invention relates to a new and improved corrosion resistant fastener and a method of coating a fastener with a polyester top coating having excellent impact strength. The top coating is applied over a corrosion resistant undercoating, such as zinc, to prevent corrosion in areas of the fastener which are commonly damaged during insertion of the fastener into a workpiece.

BACKGROUND OF THE INVENTION

A problem inherent in the use of corrosion resistant fasteners, such as zinc plated nails, is that where such nails are driven into a substrate or workpiece, there is serious risk of damaging the zinc plated surface, thus risking an accelerated breakdown of the corrosion resistant protection afforded by the various corrosion resistant treatments. This risk of damage is present whether the nails are driven by hand hammering or by power tool insertion. In the case of power tool driven nails there is an additional risk of damage to the corrosion resistant surface in the course of the manufacturing operation of assembling groups of nails in a form suitable for use in power tool applications. This necessary assembly operation of the nails is commonly known as collating. Corrosion resistant nails damaged in the collating manufacturing operation will exhibit characteristics of premature failure by corrosion of the exposed fastener substrate, commonly steel.

One particularly useful method of imparting corrosion resistance to ferrous substrates, such as nails, is by applying a metal flake, such as zinc flake, using a hexavalent chromium salt in an aqueous dispersion. The metal flake is usually applied by immersion and is heat converted by baking to an adherent metallic gray finish. This process is disclosed in U.S. Pat. Nos. 3,671,331; 3,687,738; 3,907,608 and 4,020,220. This process utilizing a metal flake, such as zinc flake, is referred to as "Dacrotizing" and such "Dacrotized" nails have been shown by ASTM test procedures to have corrosion resistance performance equal to or greater than conventional corrosion resistance treatments for nails, such as zinc electroplating, mechanical zinc plating, or hot dip zinc galvanizing with or without subsequent chromate rinse treatment. Since the "Dacrotized" surface is harder than the zinc surface of the conventional methods of corrosion resistant treatment, it is more susceptible to abrasion damage during manufacturing or driving and it would be a desirable improvement to prevent such damage or failure from occurring.

The invention disclosed herein solves the above mentioned problems of protecting the corrosion resistant surface treatment, such as zinc coating, from damage in the collating manufacturing operation and from damage due to impact on driving the nails, or other fasteners, into a substrate. A further improvement as a result of this invention is that the long term corrosion resistance of the treated nails is significantly enhanced well beyond what could reasonably or normally be expected without the beneficial protective treatment afforded by the polymeric coating of the present invention. Experimental comparative test data demonstrate this significant improvement.

Although "Dacrotized" corrosion resistant treated nails are used as the main example of the improvement afforded by this invention, the invention is not necessarily limited to a "Dacrotized" substrate but may include other types of corrosion resistance treated substrates.

PRIOR ART

The following U.S. patents relate to polyester coating compositions: Nos.
2,470,752—BOBALEK
3,108,083—LAGANIS
3,532,767—DALIBOR et al.
3,553,284—RIEMHOFER et al.
3,544,656—HORNUNG et al.
3,563,372—BAUM et al.
3,600,459—VASTA
3,660,327—LONCRINI et al.
3,668,275—RIEMHOFER et al.
3,842,021—GRANT et al.
3,852,375—BIETHAN et al.
3,928,492—FANG
3,983,304—SEKHON

SUMMARY OF THE INVENTION

An object of the present invention is to provide corrosion resistant fasteners having a top coating of a particular oil-free, thermosetting, cross-linked polyester resin.

Another object of the present invention is to provide corrosion resistant fasteners having a corrosion resistant coating protected by an overcoating of a particular oil-free, cross-linked, polyester resin.

Another object of the present invention is to provide corrosion resistant fasteners by first coating an iron containing fastener with a pulverulent metal selected from the group consisting of zinc, manganese, aluminum, magnesium, mixtures thereof, and alloys thereof, in a solvent containing a hexavalent chromium-providing substance and a reducing agent for said substance; curing the metal flake-containing coating to provide a corrosion resistant protective surface on the fastener, and thereafter overcoating said surface with a particular cross-linked, oil-free, thermosetting polyester resin to protect the metal coating from damage during impact of the fastener.

Another object of the present invention is to provide a polyester top coating for fasteners having exceptionally good physical properties including toughness, resiliency, coating continuity, controllable viscosity for coating, chemical resistance to organic solvents, resistance to attack by strong acids and bases, and resistance to weathering and aging.

In brief, in accordance with the present invention, it has been found that a particular group of oil-free, cross-linked polyester resins is exceptionally suitable for protecting a metal corrosion resistant coating on fasteners by providing the physical properties of toughness and resiliency necessary to prevent damage to the corrosion resistant metal coating when the fastener is impacted when driven into a workpiece. The cured or cross-linked polyester coating is the reaction product of one or more polyols selected from the group consisting of pentaerythritol, trimethylolpropane, glycerol, ethylene glycol, triethylene glycol, neopentyl glycol, trimethylolethane, 1,2 hexanediol, 1,3 butenediol, and mixtures thereof; one or more dibasic organic acids selected from the group consisting of phthalic acid, isophthalic acid, maleic acid, adipic acid, succinic acid, sebacic acid, fumaric acid, and mixtures thereof; and an aminoplast cross-linking agent selected from the group consisting of melamine-formaldehyde, urea-formaldehyde, hexahydroxymethyl melamine, and mixtures thereof.

In accordance with an important feature of the present invention the aminoplast cross-linking agent is reacted with the polyester resin in an amount in the range of 10% to 25% by weight of polyester resin plus aminoplast, to provide the polyester resin with the required resiliency, toughness and chemical resistance necessary to protect a corrosion resistant metal fastener coating and to provide long lasting and continued corrosion resistance, since the polymeric top coating is capable of withstanding the impact of fastener insertion without damage. It has been found that polyester resins prepared by the reaction of one or more of a particular group of polyols with one or more of a particular group of dibasic organic acids, when cross-linked with an aminoplast in an amount in the range of 10% to 25% by weight of polyester plus aminoplast, provides exceptional corrosion resistance to fasteners having a corrosion resistant metal coating thereon when the cross-linked resin is applied as a top coating thereover.

DETAILED DESCRIPTION OF THE INVENTION

In accordance with the present invention, a fastener such as a nail or staple, is coated with a corrosion resistant metal coating, such as a zinc coating, as well known in the art, and the coated fastener thereafter is overcoated with a particular polyester resin having sufficient toughness and chemical resistance for a long life while also having the property of resiliency in being non-brittle. Impact of the fastener having the polyester as a top coating will not create cracks or discontinuities in the polyester coating and will protect the metal corrosion resistant coating for exceptionally long periods of time.

In accordance with an important feature of the present invention, it has been found that a particular method of applying a metal corrosion resistant undercoating on a fastener provides a metal undercoating capable of exceptionally good adherence of a particular group of oil-free, cross-linked polyester resins. In accordance with an important embodiment of the present invention, the fasteners are first "Dacrotized" in accordance with a method disclosed in U.S. Pat. Nos. 3,671,331; 3,687,738; 3,907,608 or 4,020,220. To achieve the full advantage of the present invention, zinc is the metal used in the corrosion resistant undercoating treatment. In accordance with this embodiment of the present invention, a fastener is first undercoated with a pulverulent metal selected from the group consisting of zinc, manganese, aluminum, magnesium, mixtures thereof, and alloys thereof. The metal is pulverized to a flake or powder, or both, to a size such that all the particles pass 100 mesh and a major amount pass 325 mesh (U.S. Standard Sieve Series) and preferably so that 80 weight percent or more passes 325 mesh. The flake or powdered metal is dispersed in a liquid solvent to provide a coating capable of providing 200–1000 grams of the metal per liter of the coating composition liquid medium. The coating composition contains hexavalent chromium, expressed as $C_rO_3$, in an amount such that the weight ratio of chromium, expressed as $C_rO_3$, to pulverulent metal is in the range of about 0.08:1 to 0.4:1. The pulverulent metal can be applied either dry or as a dispersion in liquid medium and can be applied to the metal fastener by any conventional method for coating a substrate with a liquid, for example, dip coating, roller coating or reverse roller coating, curtain coating, airless spray, rotary brush coating, pressure spray, or combinations of such techniques. For usual spray applications, the concentration of pulverulent metal dispersions, for a dense metal such as zinc, does not exceed about 500 grams per liter. The pulverulent metal is applied to the substrate in an amount sufficient to provide a corrosion resistant coating. It has been found that the metal coating in an amount in the range of about 1300 mg./ft.$^2$ to 2200 mg./ft.$^2$ provides sufficient corrosion resistance.

The fastener having a corrosion resistant coating, such as described above, is overcoated with a particular cross-linked, oil-free, thermosetting polyester resin. The cross-linked polyester resin is the reaction product of one or more polyols selected from the group consisting of pentaerythritol, trimethylolpropane, glycerol, ethylene glycol, triethylene glycol, neopentyl glycol, trimethylolethane, 1,2 hexanediol, 1,3 butenediol, and mixtures thereof; one or more dibasic organic acids selected from the group consisting of phthalic acid, isophthalic acid, maleic acid, adipic acid, succinic acid, sebacic acid, fumaric acid, and mixtures thereof; and an aminoplast cross-linking agent selected from the group consisting of melamine-formaldehyde, urea-formaldehyde, hexahydroxymethyl melamine, and mixtures thereof.

The fastener can be completely encapsulated with the polyester resin top coating, such as by immersion dipping, or the fastener can be coated with polyester resin over any portion which encounters a corrosive environment in use. For example, only the penetrating end, or penetrating end and shank of the fastener may be coated to protect the fastener from a corrosive substrate, or it may be necessary to coat only the impacted end of the fastener to a depth which might be expected to protrude from a fastened workpiece.

The polyol and the dibasic acid are dissolved, mixed or suspended in a suitable solvent. The reaction mixture is heated at a polymerization temperature between about 212° F. and 360° F. for a period of 2–8 hours to produce the polyester resin. It has been found that the polyester resin must be oil-free, that is, it cannot contain a fatty acid (8–22 carbon atom chain) or derivative thereof. A polyester resin containing a fatty acid or fatty acid derivative will not provide an uninterrupted, corrosion resistant coating for the fastener having sufficient toughness and resiliency to protect the fastener for long periods of time after impact when the fastener is driven into place, and will present curing problems. The polyester resin is dissolved or suspended in a suitable solvent to provide a coating composition having the polyester resin in an amount of 20–40% by weight and including the aminoplast in an amount in the range of 3–10% by weight of the coating composition. The coating composition may also contain additives and modifiers such as clay, calcium carbonate, amorphous silica, diatomaceous earth, magnesium-calcium silicate, cellulose acetate butyrate, carboxymethyl cellulose, and magnesium silicate in an amount in the range of from 1% to 15% based on the total weight of the coating composition. Suitable solvents for the coating composition include 2-butanone, isopropyl alcohol, isobutylacetate, methylisobutylketone, toluene, xylene, and methylene chloride. The solvent is generally included in the coating composition in an amount in the range of 30–80% by weight of total polyester coating composition. The polyester coating composition may be further modified by including chromate salts, such as zinc chromate, to provide added corrosion resistance and can include various dyes and pigments to impart color for decorative or identification purposes. The solvent and modifiers are added to provide a coating composition having a viscosity in the range of 10 seconds to 30 seconds as measured by a #2 Zahn cup.

Cross-linking of the composition is effected after the composition is applied as a fastener top coating by heating the polyester resin in contact with an aminoplast at a temperature in the range of about 500°–550° F. for a period of one to two minutes. Alternatively, lower temperatures can be used with longer reaction times. For example, the coating composition can be heated for 10 minutes at a temperature of 400° F., 15 minutes at 375° F., or 20 minutes at 360° F.

In accordance with an important feature of the present invention, the aminoplast may be included in the polyester coating composition in an amount sufficient to provide 10–25% by weight aminoplast based on the total weight of polyester plus aminoplast. If more than about 25% aminoplast is present in the composition, based on the total weight of polyester plus aminoplast, an excessive amount of cross-linking occurs resulting in a brittle polyester coating which will not withstand the impact necessary to drive a fastener into a workpiece. If less than about 10% aminoplast is present, based on the total weight of polyester plus aminoplast, the resulting coating is not sufficiently resistant to solvents and chemicals to provide the required corrosion resistance. The viscosity of the coating composition is important to provide sufficient coating of the fasteners. It has been found that the viscosity should be in the range of 10 seconds to 30 seconds as measured by a #2 Zahn cup to provide sufficient coverage of the corrosion resistant metal coating to prevent the coating from being corroded when exposed to the elements over extended periods after being driven into a workpiece. The polyester resin is generally provided in the coating composition in an amount in the range of about 20–40% by total weight of coating composition to provide the proper viscosity to achieve the desired thickness of polyester resin over the fastener in one application. The polyester resin coating composition can be applied in more than one application, if desired, so that less viscous polyester coating compositions can be used in the top coating.

It has been found that the weight average molecular weight of the cured polyester resin should be in the range of $4 \times 10^3$ to $1.8 \times 10^4$ and that the number average molecular weight of the polyester resin should be in the range of $1.25 \times 10^3$ to 2.75 to $10^3$. The oil-free, thermosetting, cured or cross-linked polyester resins of the present invention having molecular weights in these ranges have been found to provide the required toughness and flexibility required for the purpose of fastener coating so that the fastener can be substantially impacted when driven into place while maintaining its corrosion resistance over a long useful life. Further, these particular coatings adhere exceptionally well to a "Dacrotized" undercoating.

Laboratory evaluations were made of ferrous nail samples power driven into lumber substrate workpieces and the nail samples were exposed to ASTM B117 Salt Spray testing for the number of hours indicated in the accompanying tables below. Table I compares "Dacrotized" nails without the polyester treatment of the present invention to nails electrogalvanize zinc plated and chromate dipped; and mechanically zinc plated and chromate dipped. The test results indicated in Table II were obtained by testing similar three types of corrosion resistant nails as were used for the Table I series. Corrosion resistance failure in the test procedure is taken as the first appearance of red rust of the nail substrate (steel).

Table I

ASTM B117 Salt Spray Test Evaluation "Dacrotized" Nails versus Electrogalvanized and Mechanically Plated Zinc Clad Chromated Nails

| Total Hours Exposure | Percentage of Nails with Red Rust Failure | | |
|---|---|---|---|
| | "Dacrotized" | Electro-Galvanized | Mechanically Plated |
| 192 | 0% | 0% | 0% |
| 240 | 1% | 0% | 11% |
| 312 | 5% | 0% | 25% |
| 336 | 5% | 2% | 25% |
| 384 | 5% | 8% | 31% |
| 480 | 17% | 22% | 44% |
| 576 | 21% | 39% | 50% |
| 648 | 31% | 50% | 56% |
| 742 | 31% | 50% | 56% |
| 888 | 71% | 92% | 72% |
| 984 | 74% | 92% | 78% |

Table II

ASTM B117 Salt Spray Test Evaluation Polyester Coated "Dacrotized" Nails Versus Electrogalvanized and Mechanically Plated Zinc Clad Chromated Nails

| Total Hours Exposure | Percentage of Nails with Red Rust Failure | | |
|---|---|---|---|
| | Polyester Coated "Dacrotized" | Electro-Galvanized | Mechanically Plated |
| 240 | 0% | 5% | 25% |
| 480 | 0% | 32% | 38% |
| 624 | 0% | 78% | 50% |
| 792 | 0% | 100% | 50% |
| 1008 | 2% | 100% | 50% |

As the test results indicate, the presence of the polyester coating of the present invention very significantly improved the corrosion resistance of the "Dacrotized" nails under conditions of the ASTM B117 Salt Spray test.

Although the present invention is described in terms of particular constituents, and ranges thereof, and manner of making and using the same, it is recognized that departures may be made therefrom within the scope of the invention as defined in the appended claims.

I claim:

1. A fastener comprising an elongated, metal member having one end adapted to penetrate an article to be fastened and having a coating comprising a cured, oil-free polyester on a second end, said cured polyester portion of said coating consisting essentially of the reaction product of one or more polyols selected from the group consisting of pentaerythritol, trimethylolpropane, glycerol, ethylene glycol, triethylene glycol, neopentyl glycol, trimethylolethane, 1,2 hexanediol, 1,3 butenediol, and mixtures thereof; with one or more dibasic organic acids selected from the group consisting of phthalic acid, isophthalic acid, maleic acid, adipic acid, succinic acid, sebacic acid, fumaric acid, and mixtures thereof; said polyester cross-linked with an aminoplast cross-linking agent selected from the group consisting of melamine-formaldehyde, urea-formaldehyde, hexahydroxymethyl melamine, and mixtures thereof, said aminoplast comprising 10-25% by total weight of said polyester and aminoplast in said coating composition.

2. A fastener as defined in claim 1 wherein said coating further includes a filler selected from the group consisting of clay, calcium carbonate, amorphous silica, diatomaceous earth, magnesium-calcium silicate, cellulose acetate butyrate, carboxymethyl cellulose, and magnesium silicate in amounts in the range of from 1% to 15% based on the total weight of said cured coating.

3. A fastener as defined in claim 1 wherein said polyol and said dibasic acid are combined in molar proportions in the range of 0.7-1.2:1 to 1:0.7-1.2 and wherein said combined weight of polyol and dibasic acid comprises 20% to 40% of the total weight of the polyester coating prior to curing.

4. A fastener as defined in claim 3 wherein said polyester coating includes a solvent, prior to curing, in an amount in the range of 30% to 80% of the total weight of polyester coating prior to curing.

5. A fastener as defined in claim 1 wherein said aminoplast is included in said coating in an amount of 3% to 10% based on the total weight of said cured, polyester coating composition.

6. A fastener as defined in claim 4 wherein said solvent is an organic solvent selected from the group consisting of 2-butanone, isopropyl alcohol, isobutylacetate, methylisobutylketone, toluene, xylene, and methylene chloride.

7. A fastener as defined in claim 1 wherein the weight average molecular weight of the cured polyester resin is in the range of $4 \times 10^3$ to $1.8 \times 10^4$ and the number average molecular weight of the polyester is in the range of $1.25 \times 10^3$ to $2.75 \times 10^3$.

8. A fastener having a driving end and an opposite end adapted to be inserted into a workpiece, said driving end coated with a cured polyester resin composition substantially free from a fatty acid or fatty acid derivative, said polyester consisting essentially of the reaction product of one or more polyols selected from the group consisting of pentaerythritol, trimethylolpropane, glycerol, ethylene glycol, triethylene glycol, neopentyl glycol, trimethylolethane, 1,2 hexanediol, 1,3 butenediol, and mixtures thereof; and one or more dibasic organic acids selected from the group consisting of phthalic acid, isophthalic acid, maleic acid, adipic acid, succinic acid, sebacic acid, fumaric acid, and mixtures thereof; cross-linked with an aminoplast cross-linking agent selected from the group consisting of melamine-formaldehyde, urea-formaldehyde, hexahydroxymethyl melamine, and mixtures thereof, wherein said aminoplast is present in said cured polyester resin in an amount of 3% to 10% by weight of said cured polyester coating.

9. A fastener as defined in claim 8 wherein the combined weight of said polyol and said dibasic acid in said cured polyester coating is in the range of 75% to 97% by total weight of said cured polyester coating.

10. A method of manufacturing a corrosion resistant fastener comprising coating a metal fastener with a zinc-containing coating and over-coating said zinc coating with a polyester coating wherein said polyester consists essentially of the reaction product of one or more polyols selected from the group consisting of pentaerythritol, trimethylolpropane, glycerol, ethylene glycol, triethylene glycol, neopentyl glycol, trimethylolethane, 1,2 hexanediol, 1,3 butenediol, and mixtures thereof; and one or more dibasic organic acids selected from the group consisting of phthalic acid, isophthalic acid, maleic acid, adipic acid, succinic acid, sebacic acid, fumaric acid, and mixtures thereof; cross-linked with an aminoplast cross-linking agent selected from the group consisting of melamine-formaldehyde, urea-formaldehyde, hexahydroxymethyl melamine, and mixtures thereof, said aminoplast comprising 10-25% by total weight of said polyester and aminoplast in said coating composition.

11. A method as defined in claim 10 wherein said polyester coating includes a solvent in an amount in the range of 30% to 80% by total weight of said polyester coating and wherein said coating has a viscosity in the range of 10 seconds to 30 seconds as measured by a #2 Zahn cup.

12. A method as defined in claim 11 wherein the zinc coating is applied to said fastener from a composition comprising in liquid medium:
   a hexavalent chromium providing substance;
   a reducing agent for said substance; and
   200-1000 grams per liter of liquid medium of pulverulent zinc metal, said composition having a weight ratio of chromium, expressed as $CrO_3$, to pulverulent metal of not substantially less than 0.08:1.

13. A method as defined in claim 12 wherein said pulverulent zinc metal is coated on said fastener in an amount of 1300 mg./ft.$^2$ to 2200 mg./ft.$^2$.

14. A fastener as defined in claim 1 further including a coating, under the polyester top coating, applied to said fastener from a composition comprising in liquid medium:
   a hexavalent chromium providing substance;
   a reducing agent for said substance; and
   200-1000 grams per liter of liquid medium of pulverulent zinc metal, said composition having a weight ratio of chromium, expressed as $CrO_3$, to pulverulent metal of not substantially less than 0.08:1.

15. A method as defined in claim 14 wherein said coating applied over said fastener, and under said polyester is cured prior to applying said polyester top coating.

16. A fastener as defined in claim 1 further including a coating, under the polyester top coating, applied to said fastener from a composition comprising in liquid medium:
   a hexavalent chromium providing substance;
   a reducing agent for said substance; and
   200-1000 grams per liter of liquid medium of pulverulent metal selected from the group consisting of zinc, manganese, aluminum, magnesium, mixtures thereof, and alloys thereof, said composition having a weight ratio of chromium, expressed as $CrO_3$, to pulverulent metal of not substantially less than 0.08:1.

17. A method as defined in claim 16 wherein said pulverulent zinc metal is coated on said fastener in an amount of 1300 mg./ft.$^2$ to 2200 mg./ft.$^2$.

18. A fastener comprising an elongated, metal member having one end adapted to penetrate an article to be fastened, and having a shank portion and a driving end, said fastener including a cured, oil-free polyester coating over at least a portion thereof, said cured polyester coating consisting essentially of the reaction product of one or more polyols selected from the group consisting of pentaerythritol, trimethylolpropane, glycerol, ethylene glycol, triethylene glycol, neopentyl glycol, trimethylolethane, 1,2 hexanediol, 1,3 butenediol, and mixtures thereof; one or more dibasic organic acids selected from the group consisting of phthalic acid, isophthalic acid, maleic acid, adipic acid, succinic acid, sebacic acid, fumaric acid, and mixtures thereof; and an aminoplast cross-linking agent selected from the group consisting of melamine-formaldehyde, urea-formaldehyde, hexahydroxymethyl melamine, and mixtures thereof, wherein said aminoplast is present in said cured polyester resin in an amount of 3% to 10% by weight of said cured polyester coating.

19. A fastener as defined in claim 18 wherein said polyester coating completely encapsulates the fastener.

20. A fastener as defined in claim 18 wherein said polyester coating covers at least a portion of said fastener shank.

21. A fastener as defined in claim 18 wherein said polyester coating covers said penetrating end of said fastener.

* * * * *